United States Patent [19]

Tankus

[11] 4,103,904

[45] Aug. 1, 1978

[54] ELASTIC POSITIVE DRIVE BELLOWS SEAL

[75] Inventor: Harry Tankus, Wilmette, Ill.

[73] Assignee: Crane Packing Co., Morton Grove, Ill.

[21] Appl. No.: 831,331

[22] Filed: Sep. 7, 1977

[51] Int. Cl.² ............................................. F16J 15/36
[52] U.S. Cl. ......................................... 277/42; 277/89; 277/93 R; 277/137
[58] Field of Search ................... 277/81 R, 88–90, 277/93 R, 136, 38–43, 137, 93 SD

[56] References Cited

U.S. PATENT DOCUMENTS

| | | | |
|---|---|---|---|
| 2,432,694 | 12/1947 | Snyder | 277/42 |
| 2,525,365 | 10/1950 | Meyer | 277/89 X |
| 3,218,110 | 11/1965 | Conner | 277/81 X |
| 3,288,474 | 11/1966 | Gits | 277/88 |
| 4,018,544 | 4/1977 | Eberhardt | 277/137 X |

FOREIGN PATENT DOCUMENTS

| | | | |
|---|---|---|---|
| 419,507 | 3/1947 | Italy | 277/136 |
| 178,325 | 4/1922 | United Kingdom | 277/137 |

*Primary Examiner*—Robert S. Ward, Jr.
*Attorney, Agent, or Firm*—Haight, Hofeldt, Davis, Jambor

[57] ABSTRACT

This specification discloses a mechanical bellows seal in which torsional forces acting upon the bellows unit are opposed and minimized by a circumferential biasing device. Through appropriate structure, the biasing means constrains the opposite ends of the bellows for joint rotation, minimizing vibrational forces and slip-stick phenomenon of such seals in highly viscous fluid sealing environments.

7 Claims, 3 Drawing Figures

ABSTRACT
ELASTIC POSITIVE DRIVE BELLOWS SEAL

BACKGROUND OF THE INVENTION

Mechanical end face seals have long been used to seal a space between a rotating shaft and a housing. Typically, such seals include an annular collar mounted in sealing engagement upon a rotatable shaft. Attached to this collar and extending coaxially of the shaft is an elastomeric or metallic bellows which mounts a sealing washer having a radially extending sealing face. That face then engages the sealing face of a fixed washer mounted upon the housing. The sealing engagement of the two washers is effected by an axial bias which is usually exerted by a spring in the case of elastomeric bellows or by the inherent bias of a metallic bellows. That bias permits axial movement of the washer on the bellows to compensate for wear and alignment.

In operation of these seals, the bellows unit and its washer is rotated through the collar connection with the shaft. Opposing this rotation is the friction drag between the washers and fluid drag exerted by the fluid on the bellows. This rotation and the opposed drag results in the imposition of torsional deflection within the bellows. This torsional deflection tends to oppose the axial bias which effects sealing engagement. In addition, the fluid within the space may tend to seize the washers together and oppose their relative rotation. This seizing is often referred to as a "slip-stick" phenomenon.

To overcome this slip-stick phenomenon and to minimize torsional deflection on the bellows unit, the prior art has provided a mechanical interconnection between the opposite ends of the bellows. Such an interconnection is illustrated in U.S. Pat. No. 2,432,694 which issued Crane Packing Company on Dec. 16, 1947. The interconnection of that patent includes a tubular member attached to the washer and extending over an elastometric bellows. At the other end of the bellows, the tube is provided with slots engaged by lugs constrained for rotation with the shaft. That lug and slot interconnection comprises a positive drive between opposite ends of the bellows which accepts the friction drag forces precluding torsional deflection of the bellows.

In a metallic bellows seal, a similar positive drive interconnection has been used. Such a device is presently sold by Sealol, Inc., who identifies the seal as a Type 605HDL. In that device a slot and lug positive drive interconnection is positioned interiorly of the metal bellows.

Each of these prior art devices utilizes a rigid mechanical interconnection between opposite ends of the bellows units. That interconnection involves physical abutment between the lug and slot and results in a force component acting perpendicular to the axial bias maintaining the sealing washers in engagement. Further, this circumferential force component is normally maintained during opration of the seal by friction drag of the fluid and of the sealing washers. As a result, it is possible that the circumferential force component, when multiplied by the coefficient of friction, results in an axial force opposing the bias of the spring tending to effect sealing engagement of the washers. This friction force, combined with possible alignment problems and the accumulation of foreign practices in the interconnection may adversely affect axial sealing movement of the washers.

SUMMARY OF THE INVENTION

To minimize the effect of the slip-stick phenomenon, and to provide a positive drive bellows seal unit, the instant invention utilizes a resilient biasing means acting in a circumferential direction to interconnect the opposite ends of the bellows unit. Preferably, a tubular member, constrained for rotation with one end of the bellows, extends coaxial therewith to the other end. Between the other, or free end of the tubular member and the washer is a resilient device whose bias acts circumferentially of the seal to constrain the washer and the free end of the bellows for joint rotation. Preferably, the resilient device comprises two compression springs to provide positive drive in either direction. Alternatively, other types of springs may be used.

Accordingly, the objects of my invention are to provide a bellows-type end face seal which includes:

(a) a positive interconnection between opposite ends of the bellows unit which minimizes friction forces and alignment problems opposing movement of the sealing washer;

(b) a positive, but elastic drive interconnection between the opposite ends of the bellows;

(c) a simple bellows which facilitates assembly of the unit and installation;

(d) a positive drive interconnection which resiliently absorbs vibrations and minimizes impact forces acting on the seal components; and (e) a positive drive interconnection which minimizes build-up of foreign particles otherwise tending to clog or restrict sealing engagement between the washers.

The manner in which these and other objects of my invention are attained is disclosed in the following specification and drawings in which.

DETAIL DESCRIPTION

Figure 1:
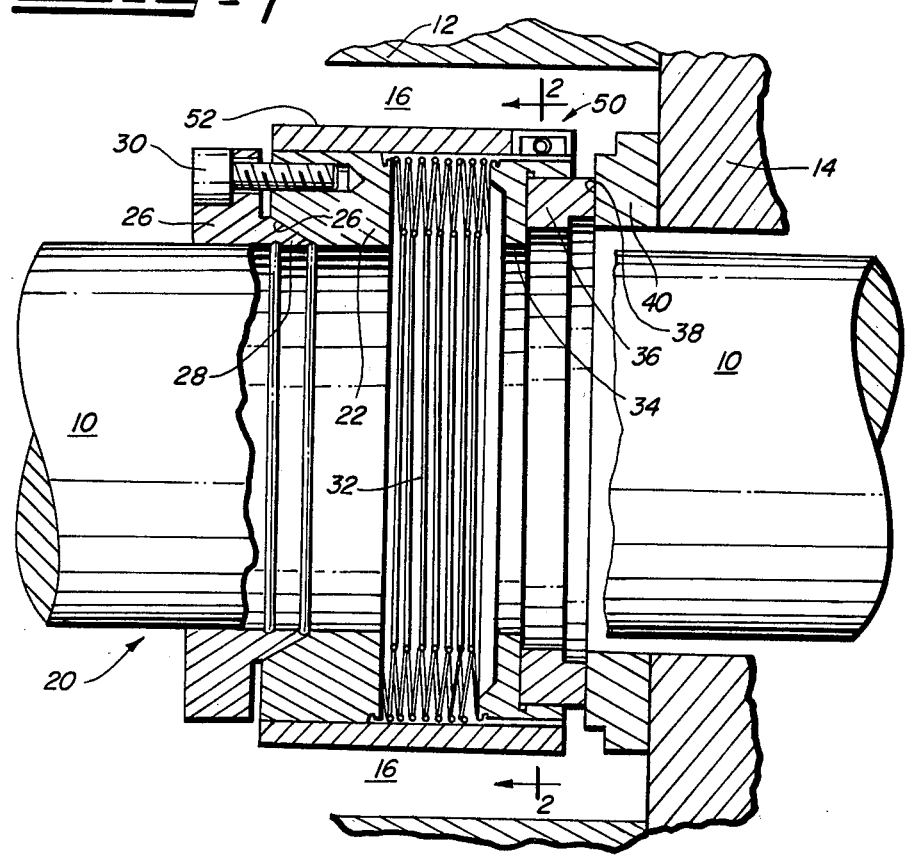
FIG. 1 is an elevational view in section taken along a plane passing through the center line of a preferred embodiment of my invention.

The preferred embodiment of my invention and its intended environment is depicted in FIG. 1. That environment includes a shaft 10 passing through a housing 12 and extending out of an associated gland plate 14. Since the housing may contain fluids or gasses under pressure, the space 16 between housing and shaft must be sealed. For that purpose a bellows seal is often used, and one which incorporates my invention is depicted at 20.

This seal 20 includes an annular collar 22 which slides over the shaft 10 and has a beveled surface 24 for receiving a wedge-type secondary seal 26. This secondary seal 26 is also an annular member having a beveled extension 28 which is forced into sealing engagement with the shaft 20 as bolts 30 are tightened to cam the extension 28 against bevel surface 24. As is known in the art, many secondary seals utilize O-rings within collar 22 as a substitute for the wedge 26 depicted in FIG. 1.

Sealingly attached to the collar 22 by welding or other means is an expansible bellows section 32. This section and the collar 22 is mounted upon the shaft 10 so as to apply a bias to retainer 34 (welded to the bellows) and a sealing washer 36, both of which rotate with the shaft 10. The forward face 38 of sealing washer 36 is lapped so as to rotate in sealing engagement against a similar surface of fixed sealing washer 40 retained by conventional means against the gland plate 14.

The structure described thus far is conventional structure for sealing a space 16 between a rotating shaft 10 and a housing 12. In the operation of such a seal 20, the relative rotation between the two sealing washers 36 and 40 together with frictional drag of fluids, impose torsional forces on the bellows unit.

Figure 2:
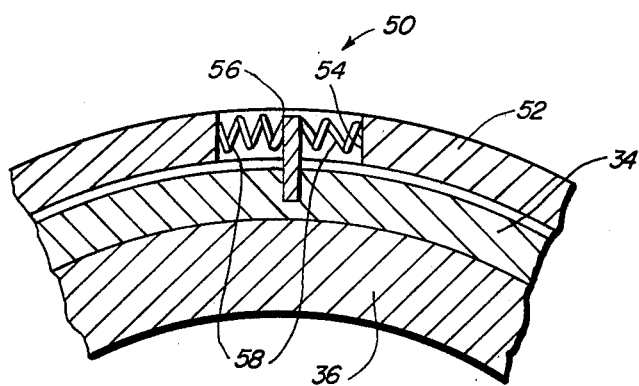
FIG. 2 is an enlarged elevational view in section taken along the lines 2—2 of FIG. 1.
Figure 3:
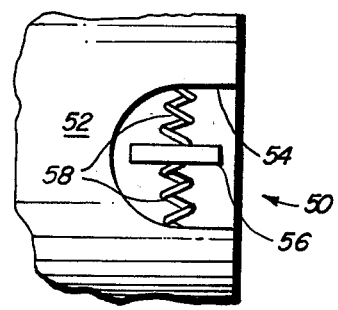
FIG. 3 is an enlarged plan view of FIG. 2.

The intent of the prsent invention is not only to minimize those torsional forces, but to do so in a manner which imposes little or no axial force component which would otherwise oppose sealing engagement of the washers. This structure is a resilient interconnection 50 between the collar 22 and the retainer 34. The interconnection 50 includes an annular sleeve 52 which is mounted upon and constrained for rotation with collar 22, preferably through a friction fit. This sleeve 52 then extends forward over the bellows 32 and the washer retainer 34. As best shown in FIG. 2, a clearance exists between the internal diameter of the sleeve 52 and the outside diameter of the retainer 34. This clearance permits free axial and rotational movement between retainer 34 and the sleeve. While the axial movement is desired, the relative rotational movement is restrained by a resilient interconnection.

That interconnection includes slots 54 formed in the sleeve 52 which extend about an upstanding tab or detent 56, constrained for rotation with the retainer 34. These tabs may be welded to the retainer or, as shown, pressfitted into slots milled in the retainer.

As shown, a substantial clearance exists between the tab 56 and the slots 54. On opposite sides of the tab 56 and abutted against the sides of slot 54 are compression springs 58. These springs 58 thus receive rotational motion from sleeve 52 and transmit same to retainer 34 and washer 36, eliminating any substantial torsional forces otherwise imposed upon the bellows unit 32.

In operation of the present invention, initial rotation of the shaft may result in some deflection of one of the springs 58 as torsional force is transmitted from sleeve 52 through the spring to overcome static friction. This deflection opposed by the spring 58 may permit limited torsional twist of the bellows unit 32. After static friction is overcome, the deflected spring 58 will expand, urging the tab 56 back towards the center of slot 54, reducing or neutralizing twist in the bellows unit 32. The deflected spring 58 may remain slightly deflected by the friction drag forces movement of washer 36. Too, the compression and expansion of the springs 58 will have a natural tendency to preclude build-up of foreign particles which may otherwise affect axial sealing movement of washer 36.

The present invention may take various forms. If desired, the sleeve 52 could be mounted internally of the bellows with the tabs 56 being formed on the internal diameter of the retainer 34. Too, other forms of resilient interconnections could be used. In addition, if an externally mounted sleeve is utilized, those skilled in the art may find it desirable to drill flush holes through sleeve 52 for permitting free fluid flow between chamber 16 and the interior of the sleeve.

I claim:

1. An elastic positive drive mechanical bellows seal for sealing a space between a housing and a rotating shaft extending therethrough, said seal comprising:
   (a) an annular collar support means mounted coaxially upon said shaft and in sealing engagement with said shaft;
   (b) an annular bellows section carried by said support means extending coaxial of said shaft and having a first sealing element mounted on an end opposite said support means, said sealing element having a first radially extending sealing face;
   (c) a sealing element carried by said housing coaxial of said shaft, and having a second radially extending sealing face positioned in mating relating to said first face;
   (d) resilient means for interconnecting said support means and said first sealing element to minimize torsional forces imposed on said bellows, said means including a biasing means whose force is directed circumferentially of said bellows;
   (e) said resilient means including a tubular member constrained for rotation with said collar means and extending coaxial of said shaft towards said washer; a detent means affixed to said washer; and compression springs interposed between said tubular member and said detent means.

2. An elastic positive drive mechanical bellows seal for sealing a space between a housing and a rotating shaft extending therethrough, said seal comprising:
   (a) an annular collar support means mounted coaxially upon said shaft and in sealing engagement with said shaft;
   (b) an annular bellows section carried by said support means extending coaxial of said shaft and having a first sealing element mounted on an end opposite said support means, said sealing element having a first radially extending sealing face;
   (c) a sealing element carried by said housing coaxial of said shaft, and having a second radially extending sealing face positioned in mating relating to said first face; and
   (d) means for interconnecting said support means and said first sealing element to minimize torsional forces imposed on said bellows, said means including a biasing means whose force is directed circumferentially of said bellows.

3. In a positive drive mechanical bellows seal having a collar mounted coaxially upon a shaft in sealing engagement therewith, a bellows unit extending from said collar coaxial of said shaft and carrying a sealing washer at its extended end, the improvement of a spring interconnection means interposed between said washer and said collar for minimizing torsional forces imposed on said washer, the bias of said interconnection means being directed circumferentially of said bellows unit.

4. A device as recited in claim 3 in which said interconnection means includes:
   (a) a tubular member extending from said collar toward said washer and constrained for rotation with said shaft;
   (b) a detent member constrained for rotation with said sealing washer; and
   (c) compression spring means interposed between said detent member and said tubular member.

5. In a positive drive mechanical bellows seal having a sealing collar for coaxial mounting upon a shaft, a bellows unit extending from said support ring and carrying, at its extended end, a sealing washer coaxial of said shaft, the improvement of:
   (a) biasing means interconnecting said sealing collar with said sealing washer for minimizing torsional forces imposed on said bellows without restricting axial movement of said sealing washer;
   (b) said biasing means being positioned to act upon said sealing washer in a circumferential direction.

6. The improvement recited in claim 5 in which said biasing means is a metallic spring.

7. The improvement recited in claim 6 in which the biasing means comprises a coil spring.

* * * * *